Oct. 9, 1962 R. M. HIRSCH 3,057,955

CRYPTOGRAPHIC ANCILLARY EQUIPMENT

Filed June 11, 1959 6 Sheets-Sheet 1

INVENTOR
RALPH M. HIRSCH

BY B. L. Zangwill
ATTORNEY

CRYPTOGRAPHIC ANCILLARY EQUIPMENT

Filed June 11, 1959

6 Sheets-Sheet 2

INVENTOR
RALPH M. HIRSCH

BY

B. L. Zangwill
ATTORNEYS.

Oct. 9, 1962

R. M. HIRSCH 3,057,955

CRYPTOGRAPHIC ANCILLARY EQUIPMENT

Filed June 11, 1959

6 Sheets-Sheet 3

INVENTOR
RALPH M. HIRSCH

BY

B. L. Zangwill
ATTORNEYS.

CRYPTOGRAPHIC ANCILLARY EQUIPMENT

Filed June 11, 1959

INVENTOR

RALPH M. HIRSCH

BY

B. L. Zangwill

ATTORNEYS.

CRYPTOGRAPHIC ANCILLARY EQUIPMENT

Filed June 11, 1959 6 Sheets-Sheet 5

INVENTOR
RALPH M. HIRSCH

BY

B. L. Zangwill
ATTORNEY

CRYPTOGRAPHIC ANCILLARY EQUIPMENT

Filed June 11, 1959 6 Sheets-Sheet 6

INVENTOR
RALPH M. HIRSCH

BY

B. L. Zangwill
ATTORNEY 3,057,955
Patented Oct. 9, 1962

3,057,955

CRYPTOGRAPHIC ANCILLARY EQUIPMENT

Ralph M. Hirsch, 205 Sussex Road, Westwood, N.J.

Filed June 11, 1959, Ser. No. 819,790
7 Claims. (Cl. 178—22)
(Granted under Title 35, U.S. Code (1952), sec. 266)

The invention described herein may be manufactured and used by or for the Government of the United States of America for governmental purposes without the payment of any royalties thereon or therefor.

This invention relates to cryptographic ancillary equipment or a code converter whereby signals from cryptographic machines may be translated to the standard Teletype code for automatic operation of page printers and tape reperforators.

Old methods of performing this function required considerable modification to the cipher machines, such as addition of translators to the machines, thus negating the use of built-in tape print out mechanisms which the machines may possess.

These old methods required that each cipher machine be modified by replacement of its built-in tape print-out mechanism with special mechanical translators which were, in the main, unique for each type of cipher machine. This system provided only a partial Teletypewriter capability, i.e. 26 out of a possible 64 characters, and negated use of the machine for tape print-out in the event of failure of the associated Teletypewriter equipment.

The general purpose of this invention is to provide automatic off-line operation at 65 words per minute of different types of cryptographic equipment and thus afford Teletypewriter page-copy and Teletypewriter reperforated tape outputs from equipment that does not inherently possess this capability, but without destroying the machines own tape print-out capability.

The new method utilizes a relay input technique which permits operation with a variety of cipher machines without any modification, mechanical or electrical thereto. It permits print-out from the cipher machines own tape printer while simultaneously providing a full 64 character print out from the associated Teletypewriter equipment. It automatically stops the cipher machine while it inserts necessary spaces, carriage returns and line feeds if and when these are required by the cryptographic procedures.

It provides a ready reference as to the location of each character of each group during the cryptographic process. It provides for columnizing digits which older types of machines could not do. It may be operated at a variety of speeds, whereas older devices could be operated at only one speed. It provides facilities whereby an operator utilizes the associated reperforator for plain-language tape cutting while the printer is printing-out deciphered text from the cipher machine without any wiring changes, and necessitating only the throwing of a single switch. It provides monitoring positions for extra Teletypewriter equipment and for measuring currents which older machines did not do.

Another purpose of the invention is to disclose an asynchronous, switch operating, cam mechanism for translating a digit as set up on relay contacts to a serial 5 pulse Teletype code.

Other objects and advantages of the invention will hereinafter become more fully apparent from the following description of the annexed drawings, which illustrate a preferred embodiment, and wherein:

FIG. 1 is a block diagram of the code converter interconnected in a complete system with a cipher device, tape reader, printer, and reperforator;

FIGS. 2A, 2B, 2C, and 2D are a schematic diagram of the code converter;

Figure 1:
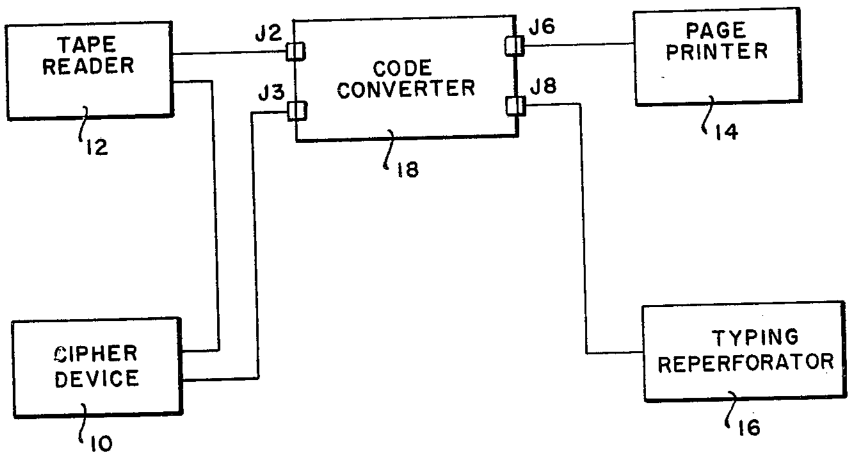

Referring now to the drawings, wherein like reference characters designate like or corresponding parts throughout the several views, there is shown in FIG. 1 a cipher device 10 which may code or decode information as transmitted by tape reader 12 or by other cryptographic equipment (not shown), which information is usually in the form of one A.C. pulse per character on one of 32 lines. A printed record of the information is usually desired as produced by a page printer 14. A perforated tape may be needed as produced by a tape reperforator 16.

The printer 14 and reperforator 16 are usually standard Model 14 or 28 machines, as produced by the Teletype Corp., Chicago, Ill., and therefore require the standard single line, 5 unit, sequential pulse form of information. The tape reader 12 is a type TSEC/HL–1B, also made by Teletype Corp.

In order to avoid putting translators in the cipher machines, a code converter 18 is herein disclosed to translate the one pulse, 32 line system to a 5 pulse, single line system and to perform other functions. The code converter 18 is connected to the other units by receptacles J2, J3, J6 and J8 as shown in FIG. 1 and as shown in more detail on FIG. 2.

Figure 2A:
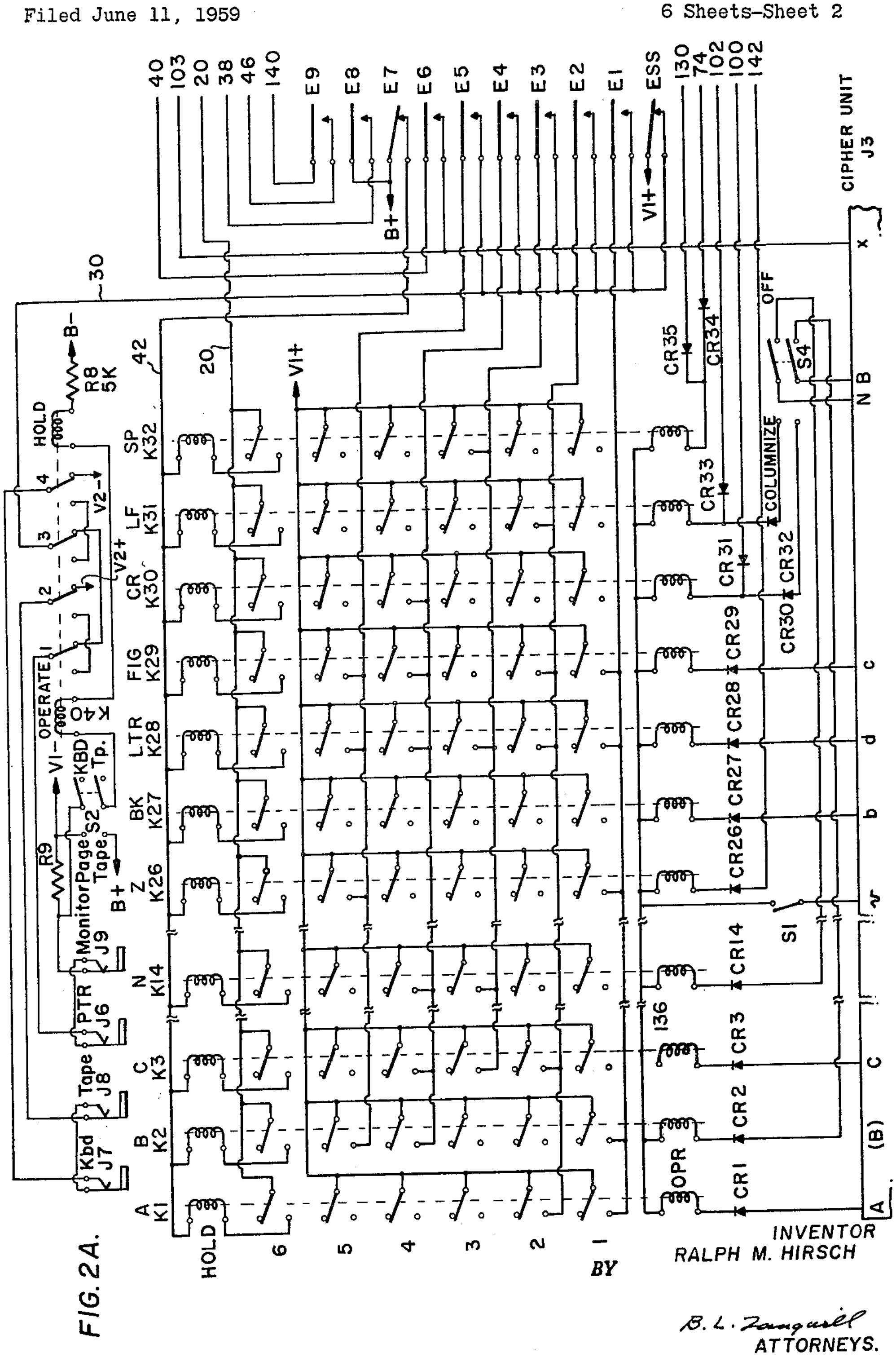
Figure 2B:
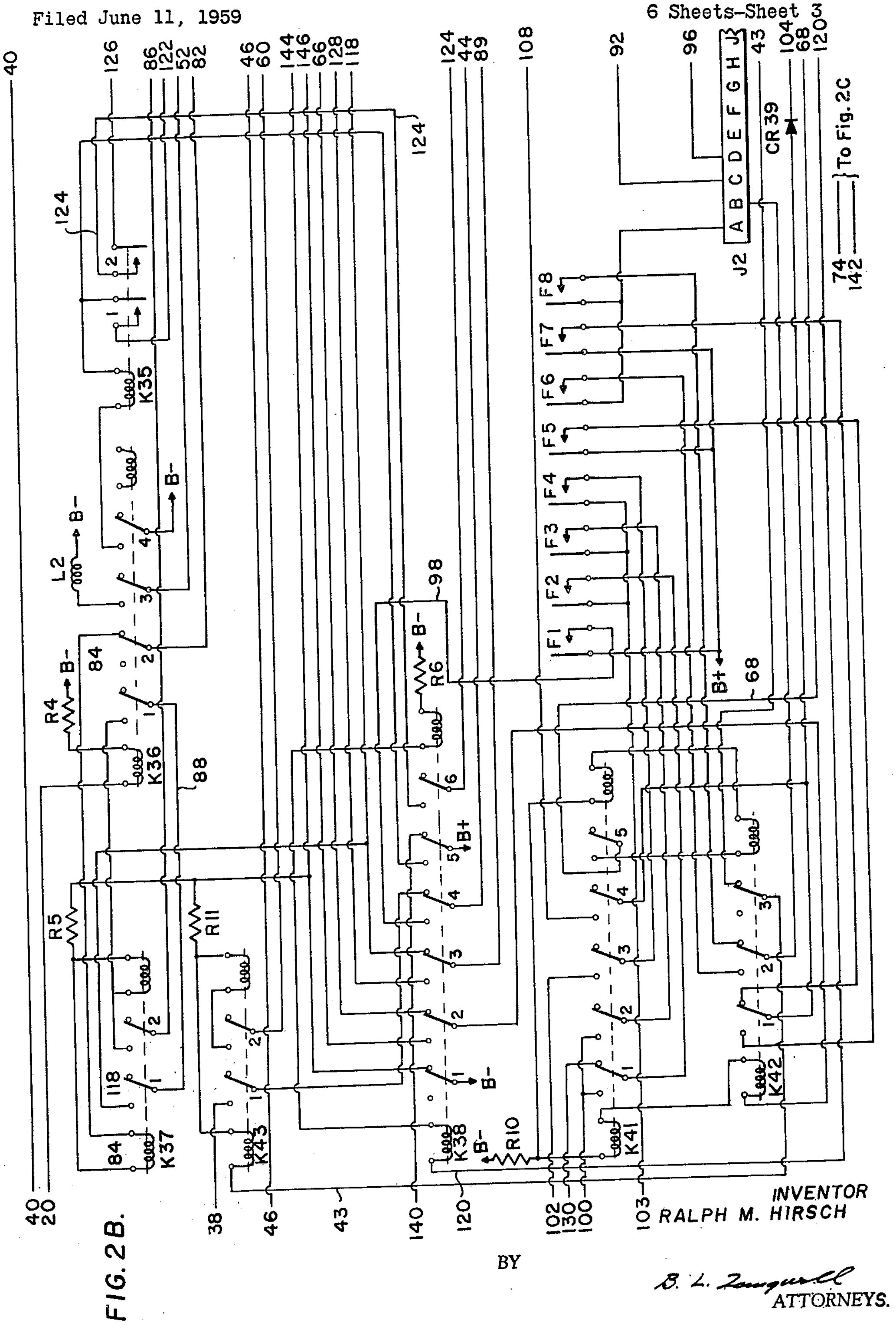
Figure 2C:
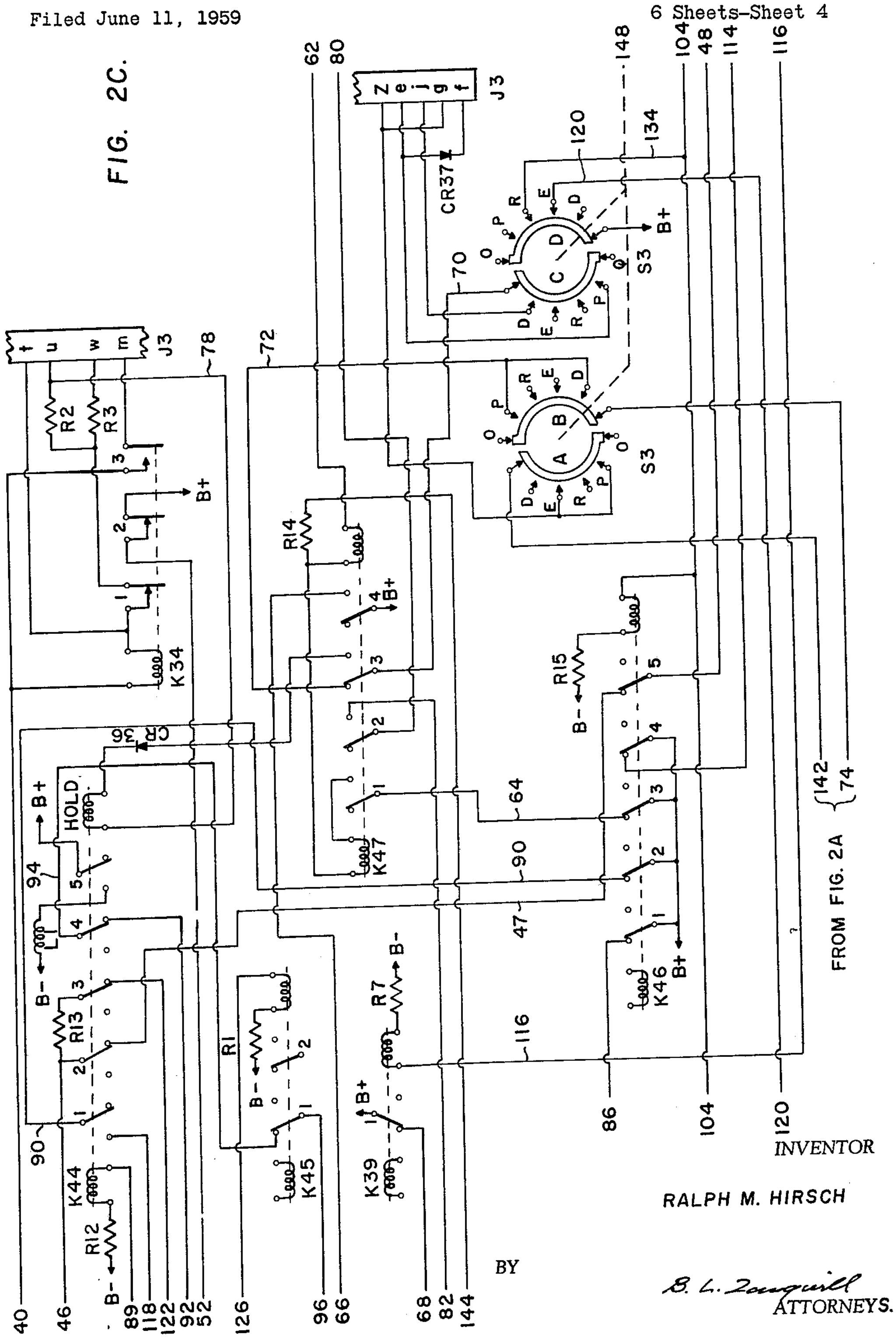

Referring to FIG. 2, the input receptacle J3 is connected to the cipher device 10 as shown in FIGS. 2A and 2C. When a pulse (which may be A.C. or D.C. depending upon the particular cipher device employed) is received from the cipher device, it is rectified by a silicon diode, CR1, 2, 3, etc., and energizes an alphabet or function relay operate coil, indicated by the row of coils marked OPR. The OPR coils have contacts 1–5 for setting up the standard Teletype code and contact 6 for energizing the Hold coils. All of the coils are part of relays K1–26 for alphabetic characters A–Z and relays K27–32 for the functions as indicated at the top of FIG. 2A. Silicon diodes type IN538 are used.

For example, if the letter A comes in, then relay K1 will lock in and contacts 1 and 2 will be connected to the output lines to switches E1 and E2 while contacts 3, 4 and 5 will have no connection to E3, E4, and E5 to thereby set up the code for A of MMSSS on the E switches. The other letters and functions are set up in the same manner. Letters D–M and O–Y have been omitted from FIG. 2A to conserve space on the drawings.

Contact 6 which energizes the Hold coils from the Hold coil common line 20, E7, and B+ also, by line 20, energizes the common operate relay K36 thru R4 and B— on FIG. 2B. Contact 3 of K36 energizes L2, the distributor cam clutch magnet.

Figures 3, 4, 5:
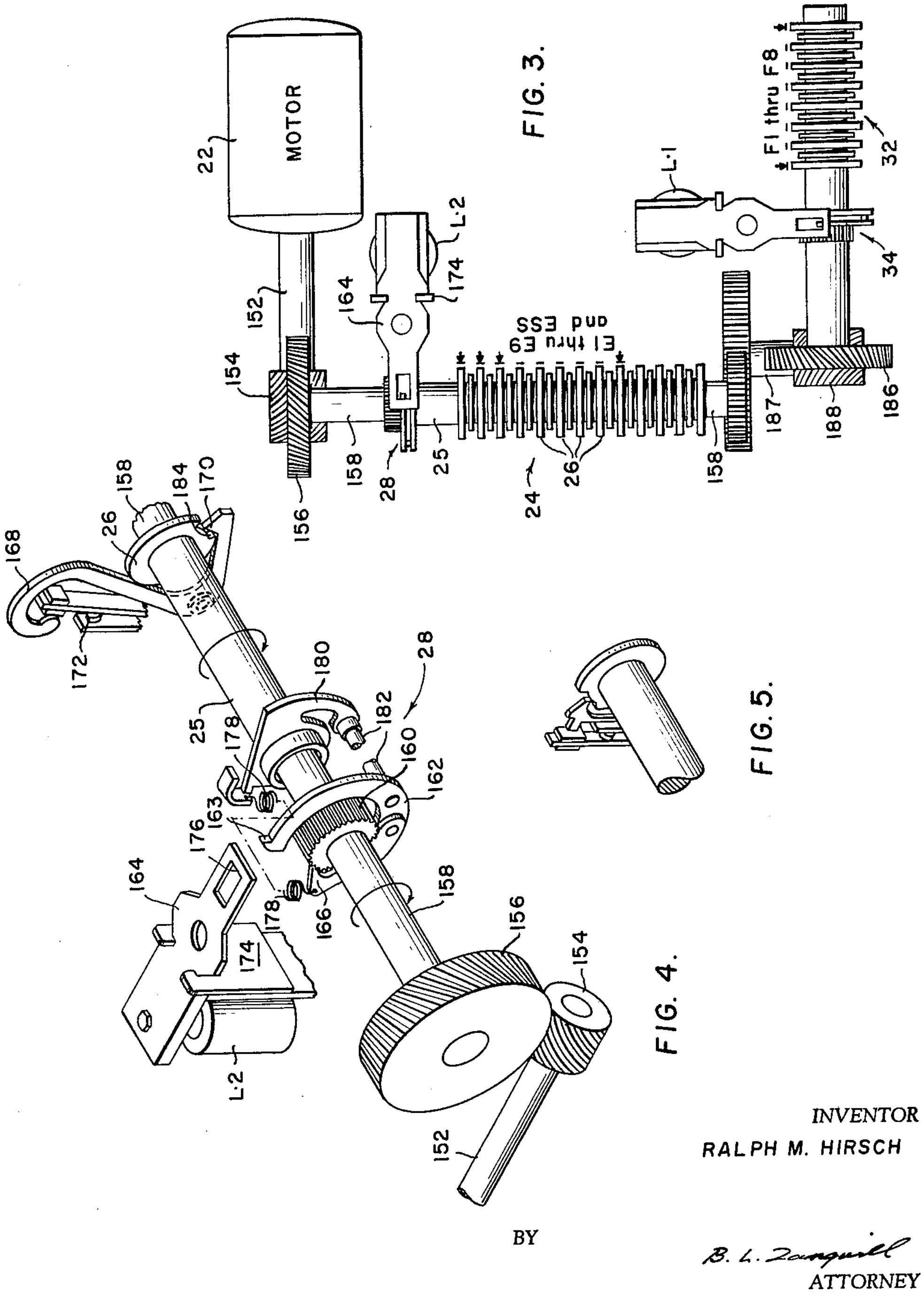
FIG. 3 is a view of the function and distributor cams and drive motor.
FIG. 4 is an exploded view of the distributor cam clutch and detail of the distributor cam and a switch.
FIG. 5 is a detail view of the function cam and switch.

Referring to FIG. 3, a motor 22 supplies power to a distributor cam sleeve assembly 24 having a shaft 25, a number of cams 26 and switches E1–9 operated by means of a clutch 28 which is tripped by clutch magnet L2. When L2 is energized, clutch 28 allows one rotation of the cam shaft 25 which closes contacts ESS and E1–5 for the proper duration and spacing to send out the Teletype code over common line 30 to plug J6 to the printer 14 and plug J8 to the reperforator 16 (see FIG. 2A).

In FIG. 3 a function cam sleeve assembly 32 is selectively operated by a second clutch 34 to produce certain functions to be described further on.

Figure 2D:
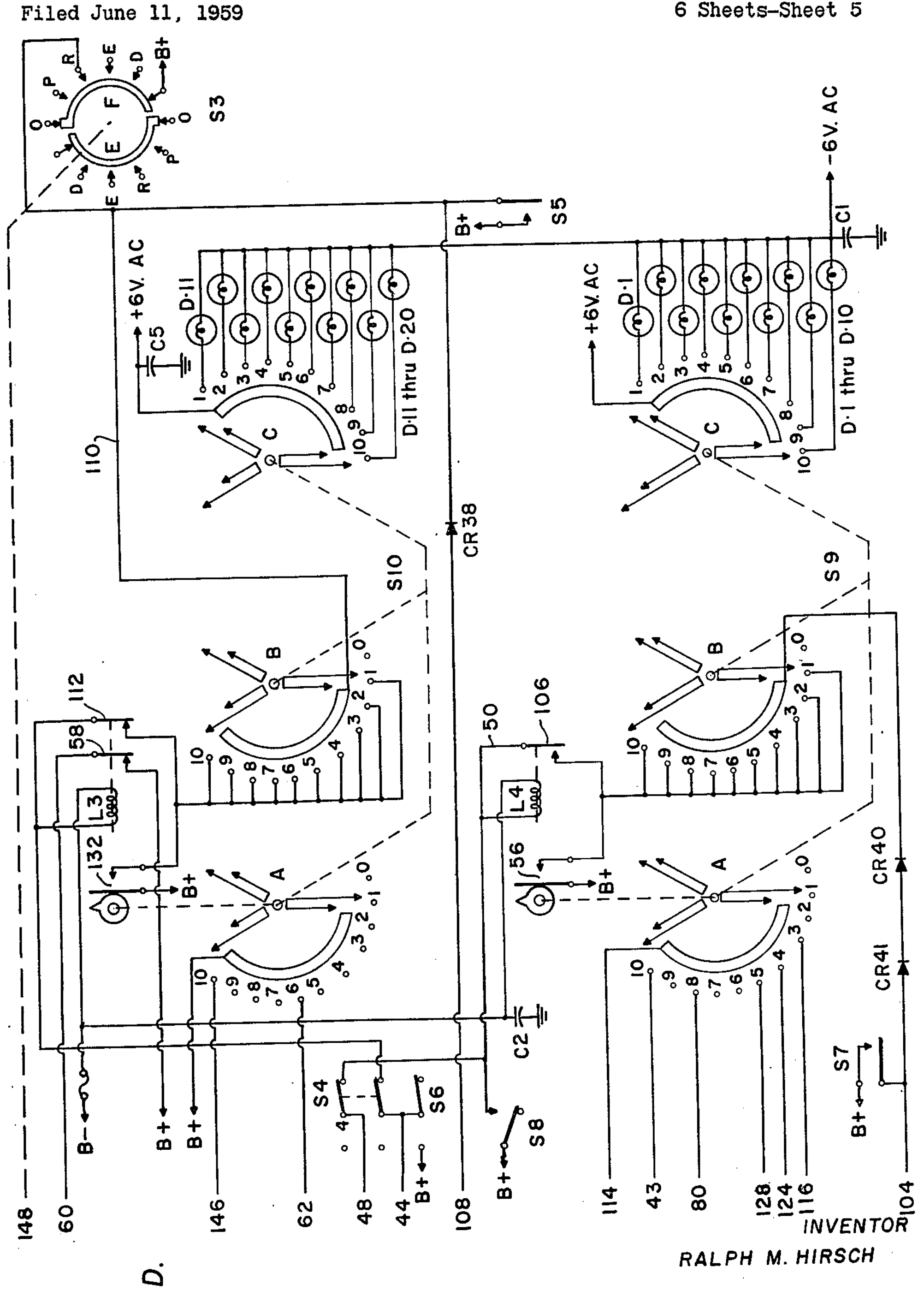

FIG. 2B shows the function cam switches F1–8, FIG. 2C shows further circuitry and part of the function controller switch S3, and FIG. 2D shows the rest of the function controller switch S3, the stepping switches S9 and S10 and the indicator lights.

Since the circuitry is rather extensive, a functional description of the operation of the code converter is here set forth.

The mode of operation of the code converter is controlled by the function controller switch S3 in the OPRED positions.

*"O"-position.*—This position of the (OPRED) function controller switch 53 removes power from all circuits which pass through it.

*"P"-position.*—In this position, the Code Converter is conditioned to transmit plain text material to the associated Teletypewriter equipment as follows:

(1) Reception of a character or function from the Cipher Device 10 on any one of the 32 wire inputs at Cipher Unit receptacle (J3) causes the corresponding alphabet relay (or function relay) to be operated through its operate coil OPR.

(2) As the number 6 contact of this relay operates, the common operate relay K36, FIG. 2B, is energized by line 20 and the Hold coil of the alphabet relay is energized, locking both relays. A current limiting resistor R4 is wired in series to protect the hold coil of the relay.

(3) The first five contacts of the energized alphabet relay place the 5-unit sequential code of the applicable letter (or function) at contacts E1–5 of the distributor cam assembly 24.

(4) When the common operate relay K36 is energized ((2) above) its number 3 contacts energize the coil L2 of the distributor clutch magnet.

(5) When coil L2 is energized, the distributor cam sleeve assembly 24 rotates and contacts ESS and E1–9 are closed sequentially.

(6) The ESS contact transmits a start signal by line 30 to the associated equipment through plugs 16–9 and E1–5 transmit the 5-unit sequential code followed by a stop signal as ESS again closes. Contact E6 by line 40 energizes the non-repeat relay K34, see FIG. 2C.

(7) When the E7 contact is opened by rotation of distributor cam sleeve assembly 24, the Hold coils of the selected alphabet relay by line 42 and the common operate relay K36 by line 20 are opened and both relays are released preparing them for the reception of the next character.

(8) When the E8 contact is closed a D.C. pulse is delivered by line 38 to the number one contacts of the unit 10 relay K43. If the K43 relay is not energized, the pulse goes no further. If relay K43 has been activated by the unit stepping switch S9 (level A) advancing to its 10th position and connected by line 43 through number 3 contact of relay K42 to the operate coil of K43, the pulse from the E8 contact by line 38, contact 1 of K43 contact 4 of K38, and line 44 operates coil L3 of group stepping switch S10 one position.

(9) When E9 contact is closed, coil L4 of the unit stepping switch S9 is advanced one position by way of line 46, contact 2 of K44, contact 5 of K46, line 48, contact 4 of columnize switch S4, and line 50 to L4.

(10) When the non-repeat relay (K34) was energized, it released the coil L2 by contact 2 of K34 and line 52 which allows the armature extension 164 to be lowered to a position which will permit it to limit the cam shaft 25 to one full revolution. The K34 relay by contact 3 also held the alphabet relay circuits open to prevent the reception of another character until the cycle is completed. The non-repeat relay (K34) can also be operated by a locking A.C. pulse from the cipher unit. This relay action prevents repeat operation of a character if a key would be held in the operate position too long. This operating A.C. pulse would be received at pin *"x"* of receptacle J3.

(11) At the beginning of operation, the unit S9 and group S10 stepping switches are stepped to the "O" or "Home" position. As each character is transmitted to the associated equipment, the unit stepping switch is advanced one as in (9) above. When S9 (level A) reaches the 10th step; it operates the unit 10 relay K43 as in (8) above, and the group stepping switch S10 is stepped once, as in (8) above, while the unit stepping switch S9 is stepped to its "O" position by its own contacts 56 energizing L4 as the group stepping switch S10 advances one position, as set of its interrupter contacts 58, by line 60 and contact 2 of K43, opens the hold circuit of K43 to release K43.

(12) When the group stepping switch S10 (level A) advances to position number 6, it operates group 6 relay K47 by line 62. K47 locks itself through its own contact 1 and number 3 normally closed contacts of the reset relay K46 through line 64. The number 4 contacts of the group 6 relay K47 in turn operate group 10 K41 and group 10–1 K41 relays by line 66 and contact 2 of K38. K41 and K42 relays lock themselves in through number 5 contacts of K41, line 68, and number 1 contacts of the unit 3 relay K39.

(13) A space signal input at terminal *e* on plug J3 (FIG. 2C) passes through section C of S3 and line 70 and is switched by contact 3 of K47 from the space alphabet relay K32 (line 72, section B of S3, line 74 and CR34) to the hold coil of K44 by line 76 and CR36. It should be noted at this point that K44 is operated through its hold coil since the space pulse is A.C. from the cipher unit and when passed through diode CR36 must have its own return circuit by line 78 to terminal *u* on J3 independent on the internal D.C. control circuits in the Code converter. The unit 5 relay K44 may also be operated through the operate coil by the internal circuits when the 69th character is received (see (16) below).

(14) When the unit stepping switch S9 (level A) steps to position 8, contacts 2 of K47 through lines 80 and 82 connects position 8 to contacts 2 on K36, which by line 84 holds unit 8 relay K37 inoperated until K36 is released at the end of the 68th character transmission.

(15) When the common operate relay K36 releases after the transmission of the 68th character, the unit 8 relay K37 is operated by line 84 and is locked in by its number 2 contact, line 86, and contact 1 of K46.

(16) When the 69th character operates K36, the unit 5 relay K44 is operated by contact 1 of K36, line 88, contact 1 of K37, line 118 contact 3 of K38, and line 89, while K44 locks in through its number 1 contact, line 90 and number 2 contact of K46.

(17) Thus, either the reception of a space code composition after 60 characters have been counted or the reception of the 69th character, will cause the unit 5 relay K44 to be operated.

(18) When K44 is operated, contact 4 through line 92 to terminal C of J2 and through line 94 to contact 1 of K45, line 96, and terminal D of J2 opens the Tape Reader 12 clutch circuit to prevent the sending of another signal until the CR, CR, LF functions have been transmitted and opens the unit stepping switch advance coil L4 by contact 2 of K44 as described in (9) above so that the functions will not be counted as characters received.

(19) The operated unit 5 relay K44 by contact 5 energizes the function cam clutch magnet coil L1 and the function cam sleeve assembly 32 makes one revolution. Contact F1 of assembly 32 transmits a D.C. voltage by line 98 to contact 4 of K38 where it is terminated. Contacts F2, F3, and F4 transmit pulses to contacts 1, 2 and 3 of K41 where by lines 100 for contacts 1 and 2 and CR31 to carriage return K30 and line 102 for contact 3 and CR33 to the line feed relay K31. As these relays are operated, the common operate relay K36 is activated and the CR—CR—LF functions are sent to the associated Teletypewriter equipment by the distributor cam assembly 24. It should be noted at this time that the E9 contact of the distributor cam assembly 24 will not advance the stepping switches since relay K44 has opened contact 2 (see (18) above).

(20) The closing of contact F7 of the function cam assembly 32 sends a pulse to contact 1 of K42 from whence it is sent through CR39 to the reset relay K46 and to the unit stepping switch S9 by line 104, through level B of S9 to switch 106 and coil L4. The pulse also resets the group stepping switch S10 by going from contact 1 of K42 to contact 4 of K41, by line 108 to CR 38 (FIG. 2D), through level B of S10 by line 110, and through interrupter switch 112 and coil L3.

(21) The operation of the reset relay K46 opens contact 4 in its group and removes power from line 114, level A of S9, contact 3 of level A through line 116 to K39, and contact 10 of level A through line 43 and contact 3 of K42 to the operate coil of K43 to prevent K39 and K43 from being operated as the unit stepping switch S9 wiper spring passes over the number 3 and 10 contacts during reset. Contact 3 of K46 deenergizes the Hold coil of K47 through line 64 and contact 1 of K47. Contact 2 of K46 through line 90, contact 1 of K44, line 118, contact 1 of K37, line 88, and contact 1 of K36, deenergizes the Hold coil of K37. Contact 2 of K46 by line 90, contact 1 of K44, line 118, contact 3 of K38, and line 89 also deenergizes the operate coil of K44.

(22) As the function cam sleeve assembly 32 nears the end of its revolution, F7 releases the rest relay K46 (see (20)) above and F8 by contact 2 of K42 sends a start pulse to the tape reader 12 clutch control circuit from terminal B of plug J2 and a new line of copy is transmitted to the associated Teletypewriter equipment. As the unit stepping switch S9 (level A) advances to its third position, power is applied to the unit 3 relay K39 by line 116 and the hold circuits of group 10 K41 and group 10–1 K42 are opened allowing the two relays to release by means of contact 1 of K39, line 68, and contact 5 of K41.

*"D"-position.*—In this position, the Code Converter is conditioned to transmit deciphered material, as received from the Cipher Device, to the associated Teletypewriter equipment as follows:

(1) In general, the operation of the Code Converter in the "D"-position is in the routing of the space alphabet relay operating circuit.

(2) Since the character "Z" is substituted for a space function when deciphering, it must be routed to the space alphabet relay. In the case of the Cipher Device, a "Z" is converted to a space output before it leaves the Cipher Device, and is brought to terminals *"e"* and *"f"* of the Code Converter Cipher Unit receptacle (J3), FIG. 2C. Terminal *"f"* is wired to "D"-position "C" section of the (OPRED) function controller switch (S3).

(3) In the case of the Cipher Device, the space conversion must be made in the Code Converter, as follows. The "Z" pin input at the Cipher Unit receptacle (J3) is strapped to terminal *"g"* and the cable plug connects terminal *"g"* to terminal *"j."*

*"E"-position.*—In this position the Code Converter is conditioned to transmit enciphered material to the associated Teletypewriter equipment. Most of the control relay circuit changes are accomplished by energizing the encipher-decipher relay (K38). The operation of the alphabet circuits is similar to that of the "P"-position. In the "E"-position a Space function is inserted by the Code Converter to the associated Teletypewriter equipment after each five-letter group is received, i.e., five letters, a space, five letters, a space, etc. After 10 five-letter groups have been transmitted, the Code Converter automatically stops the Tape Reader and transmits CR—CR—LF functions to the associated Teletypewriter equipment. This mode of operation is accomplished as follows:

(1) When the (OPRED) function controller switch (S3) (section D—FIG. 2C) is placed in the "E"-position, the encipher-decipher relay (K38) is energized through line 120 by its operate and hold coils.

(2) As in the "P"-position, the reception of a character on any one of the 32 wire input alphabet circuits from the Cipher Device at J3 will operate the common operate relay (K36). The K36 relay trips the distributor cam assembly clutch magnet coil (L2) and by contact 4 also operates the unit step relay (K35).

(3) The distributor cam sleeve rotates and transmits the proper sequential signal to the associated Teletypewriter equipment (as discussed in the "P"-position theory) and the unit step relay (K35) advances the unit stepping switch (S9) through contact 1 of K35, line 122, contact 3 on K44, contact 2 of K44, line 47, contact 5 of K46, line 48, switch S4, and to L4.

(4) When the unit stepping switch (S9) advances to the 4th position, and the common operate (K36) and unit step (K35) relay are released, D.C. voltage is applied to the K35 relay number two contacts by line 124 through the number 6 contacts of the encipher-decipher relay (K38). When the unit step relay K35 is actuated for the fifth character, its conditioned contacts (two) route the D.C. voltage by line 126 to operate the suppressor relay (K45).

(5) When the suppressor relay (K45) is energized, its number one contacts open the Tape Reader clutch circuit lines 94 and 96 to prevent the reception of another character until a space function can be inserted.

(6) As the unit step relay (K35) is released after the transmission of the fifth character, the unit stepping switch (S9) advances to its fifth position and operates the unit 5 relay (K44) through its operate coil by means of line 128, contact 3 of K38, and line 89.

(7) The unit 5 relay K44 energizes the function cam assembly clutch magnetic coil (L1) and through its number 2 contacts, line 47, contact 5 of K4, line 48, and S4 to L4, opens the unit stepping switch (S9) advancing circuit.

(8) As the function cam sleeve assembly rotates, it transmits an advance pulse from F1 by line 98, contact 4 of K38, and line 44 to the group stepping switch (S10), followed by a pulse from F2 through the normally closed number one contacts of the unoperated group 10 relay (K41) line 130, and CR35 to the space alphabet relay (K32). When the space relay (K34) is energized, the distributor cam assembly 24 transmits a space code combination to the associated Teletypewriter equipment.

(9) Further rotation of the function cam sleeve assembly 32 to close F7 transmits a pulse to operate the reset relay (K46) and to reset the unit stepping switch (S9) to its "O" or "Home" position. The reset relay K46 also holds open the operate circuit of the unit 10 relay (K43) while the unit stepping switch advances to its "Home" position. As the unit stepping switch (S9) leaves the fifth position, the unit 5 relay (K44) is released.

(10) As the function cam sleeve assembly 32 nears the end of its revolution, a Start pulse is transmitted to the Tape Reader clutch control circuit by F8. The Tape Reader then proceeds to transmit the next five-letter group to the Code Converter.

(11) When the group stepping switch (S10) reaches its 10th position, fixed D.C. power is applied to the operate coils of the group 10 (K41) and group 10–1 (K42) relays which are locked through the number five contacts of the group 10 relay (K41) and the number one normally closed contacts of the unit 3 relay (K39).

(12) The function cam sleeve assembly 32 then transmits pulses from F2, 3 and 4 through the number one, two and three contacts of the operated group 10 relay (K41) to the carriage return (K30) and line feed (K31) function relays. These function relays in turn transmit CR—CR—LF function to the associated Teletypewriter equipment through the distributor cam assembly 24 as described under "P"-position operation.

(13) When the third character of the first group in the next line is transmitted by the Code Converter, the unit stepping switch (S9) operates the unit 3 relay (K39) through the stepping switches number three position level A and line 116. When the unit 3 relay K39 is operated, the D.C. power to the number five contact of the group 10 relay (K41) is removed by line 68, and the group 10 (K41) and group 10–1 (K42) relays are released so that a Space function may again be transmitted between every five-letter group.

*"R"-position.*—In this position fixed D.C. power is applied directly to the wiper springs of the strapped middle contact bank (level B) of the unit and group stepping switches (S9 and S10). This causes the switches to reset (through their interrupter contacts) to the "Home" positions. The "R"-position of the (OPRED) function controller switch (S3) is placed between the "P"- and "E"- positions so that when the mode of operation is changed, the stepping switches are automatically reset.

*Advance switch operation.*—Operation of the Advance toggle switches (S6 or S8) for either the unit or group stepping switches, causes fixed D.C. power to be applied to the step magnet coil (L4) of the stepping switch. Release of the Advance switch removes power and the stepping switch advances. Thus it is possible to set the unit and group stepping switches to any desired position to compensate for any text material placed on the associated teletypewriter equipment directly from its own keyboard.

*Reset push button operation.*—Operation of the Reset push buttons (S5 or S7) for either the unit or group stepping switches applies fixed D.C. power direct to the wiper springs of the strapped inside contact bank level B of that stepping switch, and cause the stepping switch to reset (through its interrupter contacts) to the "Home" position. Four diodes (CR38 to CR41) are employed in the reset circuit to prevent interaction due to back circuits. When the Unit Reset push button (S7) is operated, it operates the reset relay (K46) by line 104. This prevents unit 10 relay (K43) from being operated and locked up as the unit stepping switch resets.

Switch S1 applies A.C. power to the code converter by being connected between the common line 136 of the operate coils of relays K1–32 and terminal *v* of plug J3. S1 also applies power to the motor 22 circuit (not shown).

Switch S2 in the KBD-Tape position applies the signal from the common distributor cam switch line 30 by means of relay K40 to the page printer J6 plug and monitor plug J9 and in the Page-Tape position also applies the signal to the keyboard plug J7 and tape reperforator plug J8.

*Columnize switch.*—In the "Columnize" position of this switch (S4), the unit and group stepping switches advance circuits are opened, and the reception of the characters "B" and "N" respectively cause carriage return and line feed function to be transmitted by the Code Converter to the associated Teletypewriter equipment. This switch is a 4-pole, double throw toggle switch.

Level C of the stepping switches (S9 and S10) applies power to the display lamps D1–20 for indicating the number of characters received.

*Distributor cam assembly.*—Referring to FIGS. 3 and 4, the motor 22 has a shaft 152 driving a pinion 154 which drives a distributor cam drive gear 156 mounted on shaft 158 at 450 r.p.m. The clutch ratchet 160 and distributor cam drive gear 156 are mounted on the common shaft 158 so that when one is driven the other will rotate in the same direction. As long as the clutch lever stop 163 is held by the armature extension 164, the clutch pawl 166 will not be engaged in the clutch ratchet 160 and the cam sleeve assembly 24 and shaft 25 will not rotate. When the clutch lever stop 163 is held by the armature extension 164 the contact lever 168 cam tip 170 will be riding on the high part of the cam 26 and the contact lever 168 will keep the electrical contacts 172 separated.

When an input is received at one of the relays in the alphabet circuit, the common operate relay K36 will be energized and when this relay is closed the clutch magnet L2 will be energized.

When the clutch magnet L2 is energized, it will attract the armature extension 164 downward. The armature extension 164 pivots in the clamp plate 174 so that the opposite end 176 will move upward.

When the armature extension end 176 moves upward, it releases its hold on the clutch lever stop 163. As soon as the clutch lever stop 163 is released, the clutch pawl 166 will be pulled up by the spring 178 attached to the cam sleeve drive arm 180.

When the clutch pawl 166 is pulled up, it will engage the clutch ratchet 160.

As mentioned before, the clutch ratchet 160 is constantly being rotated by the motor pinion 159. When the pawl 160 engages the ratchet 160 the clutch pawl 166 and clutch lever 162 rotate with the clutch ratchet 160.

The clutch lever 162 and clutch pawl 166 pivot on a pin 182 from the cam sleeve drive arm 180 which is permanently secured to the cam sleeve assembly 24.

Since the clutch lever 162 and pawl 166 are rotating, the rotation will be transmitted to the cam sleeve assembly 24 thus driving the cams 26.

The contact 172 springs keep the contact lever 168 bearing against the cam 26 surface so that when the detent 184 of the cam reaches the contact lever tip 170, the contact lever will be forced into the detent, and thereby allow the electrical contact on the contact spring to touch the stationary electrical contact.

Shortly after the armature extension 164 releases the clutch lever 162, the clutch magnet 62 will be de-energized by the sequence of relay actions in the Code Converter and the armature extension 164 will be spring-returned to its original position. All this will have taken place before the clutch lever stop 163 has made one revolution.

When the clutch lever 162 comes around to complete its revolution, the stop 163 will be grabbed by the armature extension end 176. This will cause the clutch lever 162 and clutch pawl 166 to pivot on the pin 182 of the cam sleeve drive arm 180 and thus disengage the clutch pawl 166 from the clutch ratchet 160.

Disengaging the clutch pawl 166 from the clutch ratchet 160 will keep the cam sleeve assembly 24 from continuing its rotation while permitting the clutch ratchet 160 to rotate freely from the driving torque of the distributor cam drive gear 156.

*Function cam assembly.*—The function cam drive gear 186 is constantly being driven at 73 r.p.m. by the intermediate shaft 187 pinion 188 but the clutch 34 prevents the function cam sleeve assembly 32 from rotating in exactly the same manner as the clutch mechanism of the distributor cam assembly 24 does.

Energizing the clutch magnet L1 of the function cam assembly 32 will result in the same mechanical engagements and resulting electrical contact makes discussed in the mechanical theory of the distributor cam assembly.

The only basic differences in the operation of the two assemblies are in the shapes of the contact levers and the size of the cams on the cam sleeve assembly, as shown in FIG. 5. In all other aspects, their mechanical theory is identical.

The lower rotational speed of the function cam assembly 32 allows the CR—CR—LF functions to be transmitted by the distributor cam assembly 24 during one rotation of the function cam assembly 32.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. In a cryptographic system having a cipher device for transmitting information as a single pulse on a plurality of lines and an output device such as a page printer responsive to the standard Teletype single line, sequential pulse form of information, the combination with said devices of a code converter means for translating said plural line output of said cipher device to a sequential pulse, single line form of information for said output device.

2. In a cryptographic system according to claim 1 and further characterized by means in said code converter means for automatically counting said pulses and means connected to said counting means for inserting specified Teletype functions in said sequential pulse form of information.

3. A code converter for translating a single pulse, plural line input to a single line, sequential pulse Teletype code output comprising relay means responsive to said plural line input and having contacts for setting up the corresponding Teletype code, and asynchronously operated means connected to said relay means for selectively connecting said contacts to said output.

4. A code converter having a plural line input and a serial output comprising rectifying means connected to said plural input, relay means connected to said rectifying means and having contacts for setting up the corresponding Teletype code, a plurality of switches connected to said contacts for connecting said contacts serially to said output, and asynchronous cam means connected to said relay means for operating said switches.

5. A code converter for translating a single pulse, plural wire input from a cipher device to a single line, sequential pulse output to a reperforator and printer comprising a plurality of relays responsive to said plural wire input having a plurality of contacts, a series of distributor switches connected to said single line output, means connecting said contacts and said distributor switches according to the band structure of said sequential pulses, a motor, a distributor cam clutch connected to said motor, a distributor cam assembly connected to said clutch for operating said distributor switches, means connected to said plurality of contacts for operating said distributor cam clutch and thereby allowing said distributor cam assembly to rotate once for each single pulse input, a plurality of stepping switches connected to said distributor switches for counting said single pulse inputs, a function cam clutch connected to said motor, a function cam assembly connected to some of said plurality of relays for inserting certain predetermined functions in said sequential pulse output, and means connected to said stepping switches and said distributor cam switches for energizing said function cam clutch and for stopping said cipher device while said predetermined functions are inserted in said sequential pulse output.

6. A code converter according to claim 5 and further characterized by said distributor cam clutch comprising a ratchet driven by said motor, a clutch lever connected to said distributor cam assembly having a pawl for engagement with said ratchet and a stop, and an electromagnet having a coil operated by said means connected to said plurality of contacts and an armature for engaging said stop whereby said stop may be released to allow said pawl to engage said ratchet and drive said lever and distributor cam assembly for one revolution of said ratchet.

7. A code converter according to claim 5 and further characterized by said certain predetermined functions comprising carriage return and line feed.

References Cited in the file of this patent

UNITED STATES PATENTS

| | | |
|---|---|---|
| 2,724,739 | Harris | Nov. 22, 1955 |
| 2,831,058 | Finch | Apr. 15, 1958 |
| 2,899,498 | Thompson | Aug. 11, 1959 |
| 2,549,796 | Frost | Apr. 24, 1961 |